United States Patent
Min et al.

(10) Patent No.: US 12,354,233 B2
(45) Date of Patent: Jul. 8, 2025

(54) SYSTEM AND METHOD FOR IMPROVING IMAGE RESOLUTION OF 3-D REFRACTIVE INDEX MICROSCOPE BASED ON AI TECHNOLOGY

(71) Applicant: Tomocube, Inc., Daejeon (KR)

(72) Inventors: Hyunseok Min, Daejeon (KR); Dongmin Ryu, Daejeon (KR); Woonsoo Lee, Daejeon (KR); Hansol Yoon, Daejeon (KR)

(73) Assignee: Tomocube, Inc., Yuseong-gu (KR)

( * ) Notice: Subject to any disclaimer, the term of this patent is extended or adjusted under 35 U.S.C. 154(b) by 352 days.

(21) Appl. No.: 17/818,987

(22) Filed: Aug. 11, 2022

(65) Prior Publication Data

US 2023/0410256 A1    Dec. 21, 2023

(30) Foreign Application Priority Data

May 30, 2022   (KR) ........................ 10-2022-0065988

(51) Int. Cl.
*G06T 3/4053*    (2024.01)
*G02B 21/36*    (2006.01)
(Continued)

(52) U.S. Cl.
CPC .......... *G06T 3/4053* (2013.01); *G02B 21/367* (2013.01); *G06T 3/4023* (2013.01);
(Continued)

(58) Field of Classification Search
CPC ............. G06T 7/73; G06T 2207/30196; G06T 2207/30232; G06T 2207/10016; G06T 7/75; G06F 16/532; G06F 16/5854
See application file for complete search history.

(56) References Cited

U.S. PATENT DOCUMENTS

2009/0109281 A1* 4/2009 Mashitani ............ H04N 13/139
                                                        348/E13.001
2018/0188686 A1* 7/2018 Park ..................... G03H 1/0866
(Continued)

FOREIGN PATENT DOCUMENTS

KR        102246439        4/2021
KR        102302333        9/2021

OTHER PUBLICATIONS

Ryu, DongHun, Dongmin Ryu, YoonSeok Baek, Hyungjoo Cho, Geon Kim, Young Seo Kim, Yongki Lee et al. "DeepRegularizer: Rapid Resolution Enhancement of Tomographic Imaging using Deep Learning." arXiv preprint arXiv:2009.13777 (2020). (Year: 2020).*

(Continued)

*Primary Examiner* — Amara Abdi
(74) *Attorney, Agent, or Firm* — Heslin Rothenberg Farley & Mesiti P.C.

(57) ABSTRACT

The present disclosure provides a system and method for improving image resolution of a three-dimensional (3-D) refractive index microscope based on an artificial intelligence (AI) technology. The present disclosure provides a technology for converting a low-resolution 3-D refractive index microscope image into a high-resolution 3-D refractive index image without physical machine conversion and re-photographing based on AI. That is, the present disclosure applies an AI technology, such as deep learning, in order to train an AI model with a physical correlation between a low-resolution 3-D refractive index microscope image and a high-resolution 3-D refractive index image of various samples, such as a cell and a tissue, and convert a low resolution image into a high resolution image without a change in a physical microscope based on the training. Furthermore, for the training of the AI model, the present (Continued)

disclosure uses physical characteristics of a refractive index image.

4 Claims, 17 Drawing Sheets

(51) Int. Cl.
  *G06T 3/4023* (2024.01)
  *G06T 3/4038* (2024.01)
  *G06T 3/4046* (2024.01)

(52) U.S. Cl.
  CPC .......... *G06T 3/4038* (2013.01); *G06T 3/4046* (2013.01); *G06T 2200/04* (2013.01)

(56) References Cited

U.S. PATENT DOCUMENTS

| | | | |
|---|---|---|---|
| 2020/0279411 A1* | 9/2020 | Atria | G06T 11/006 |
| 2021/0134054 A1* | 5/2021 | Park | G01N 21/6428 |
| 2022/0036575 A1* | 2/2022 | Shin | G16H 30/20 |
| 2022/0383562 A1* | 12/2022 | Park | G06N 3/08 |

OTHER PUBLICATIONS

J. M. Soto, J. A. Rodrigo, and T. Alieva, "Partially coherent optical diffraction tomography toward practical cell study," Frontiers in Physics, vol. 9, Jun. 2021. doi:10.3389/fphy.2021.666256 (Year: 2021).*

Federica Marone, Beat Munch, Marco Stampanoni, "Fast reconstruction algorithm dealing with tomography artifacts," Proc. SPIE 7804, Developments in X-Ray Tomography VII, 780410 (Sep. 20, 2010); doi: 10.1117/12.85970 (Year: 2010).*

Ryu et al. "DeepRegularizer: Rapid Resolution Enhancement of Tomographic Imaging using Deep Learning." IEEE (2020). (Year: 2020).*

Ryu Donghun et al.: "DeepRegularizer: Rapid Resolution Enhancement of Tomographic Imaging Using Deep Learning", IEEE Transactions on Medical Imaging, IEEE, USA, vol. 40, No. 5, Feb. 10, 2021, pp. 1508-1518.

Soto Juan M. et al.: "Partially coherent Optical Cell Study", Frontiers in Physics, vol. 9, Jun. 17, 2021.

* cited by examiner

FIG. 15

|  | Input image | | | | Output image | | | |
| --- | --- | --- | --- | --- | --- | --- | --- | --- |
|  | MSE | SSIM | PSNR | PCC | MSE | SSIM | PSNR | PCC |
| HepG2_01 | 9.082e-7 | 0.9998 | 38.07 | 0.5402 | 6.283e-7 | 0.9998 | 39.67 | 0.6565 |
| HepG2_07 | 1.132e-6 | 0.9998 | 35.78 | 0.5634 | 6.990e-7 | 0.9998 | 37.87 | 0.6994 |
| HepG2_14 | 1.031e-6 | 0.9998 | 37.28 | 0.5673 | 6.438e-7 | 0.9998 | 39.32 | 0.6962 |
| K562_01 | 9.960e-7 | 0.9998 | 38.60 | 0.5657 | 5.917e-7 | 0.9998 | 40.87 | 0.7050 |
| K562_03 | 5.77e-7 | 0.9999 | 38.81 | 0.4025 | 4.757e-7 | 0.9999 | 39.64 | 0.4998 |
| K562_14 | 1.165e-6 | 0.9998 | 38.60 | 0.6173 | 6.369e-7 | 0.9998 | 41.22 | 0.7500 |
| Yeast_05 | 5.877e-7 | 0.9998 | 43.85 | 0.1885 | 5.624e-7 | 0.9998 | 44.05 | 0.2401 |
| Yeast_14 | 5.991e-7 | 0.9998 | 43.34 | 0.2193 | 5.653e-7 | 0.9998 | 43.59 | 0.2765 |
| Yeast_16 | 5.646e-7 | 0.9998 | 43.52 | 0.1302 | 5.543e-7 | 0.9998 | 43.60 | 0.1616 |

High resolution 3-D refractive index image and
Fourier conversion image

Corresponding low resolutin 3-D refractive index
image and Fourier conversion image

SYSTEM AND METHOD FOR IMPROVING IMAGE RESOLUTION OF 3-D REFRACTIVE INDEX MICROSCOPE BASED ON AI TECHNOLOGY

CROSS-REFERENCES TO RELATED APPLICATIONS

This application is based on and claims priority under 35 U.S.C. § 119 to Korean Patent Application No. 10-2022-0065988, filed on May 30, 2022 in the Korean Intellectual Property Office, the disclosure of which is herein incorporated by reference in its entirety.

TECHNICAL FIELD

The present disclosure relates to a system and method for improving image resolution of a three-dimensional (3-D) refractive index microscope based on an artificial intelligence (AI) technology.

BACKGROUND OF THE DISCLOSURE

A 3-D quantitative phase imaging technology or a 3-D holographic microscope technology is an optical image scheme capable of measuring a 3-D refractive index distribution of a sample. A 3-D holographic microscope can monitor a detailed structure within a sample even without any labeling method unlike a fluorescent microscope that is used in accordance with the existing factual standard, and can quantitatively analyze an image based on the fact that a refractive index is linearly proportional to a concentration of a sample.

In order to measure a high-resolution 3-D refractive index, it is necessary to precisely measure optical information that is diffracted by a sample by using an object lens having a high numerical aperture (NA) value. As the NA of the object lens becomes higher, the object lens has higher space resolution, which enables an image to be minutely measured. However, there is a problem in that a field of view (FoV) which can be measured once is reduced in proportion to the NA of the object lens as the NA of the object lens becomes higher. It is impossible to simultaneously achieve a wide FoV and high resolution by using only the existing optical image technology. A method of increasing resolution in a way to measure images having several incident angles by using a lens having a low NA and composing the NAs of the lens or a method of composing FoVs in a way to measure a high-resolution image at a narrow FoV by using a lens having a high NA and then scan a cell is used. Both the two methods need to be sacrificed in terms of the time and calculation.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The present disclosure provides a technology for restoring a low resolution (low NA) image to a high resolution (high NA) image based on an artificial intelligence (AI) technology although resolution of an image is reduced because a wide area of a cell is photographed by using a low resolution (low NA) lens. That is, the present disclosure provides a technology for generating a three-dimensional (3-D) high-resolution image by rapidly photographing a wide area with low resolution and applying a deep learning algorithm in order to predict a corresponding high-resolution microscope image based on the photographing.

The present disclosure provides a system and method for improving image resolution of a 3-D refractive index microscope based on an AI technology.

According to the present disclosure, a system for improving resolution of a three-dimensional (3-D) refractive index image based on an artificial intelligence (AI) technology includes a 3-D refractive index cell image measuring unit configured to obtain a 3-D refractive index cell image, and a 3-D refractive index image conversion unit configured to perform resolution improvement on the 3-D refractive index cell image based on a deep learning algorithm.

According to the present disclosure, a method of a system improving resolution of a three-dimensional (3-D) refractive index image based on an artificial intelligence (AI) technology includes obtaining a 3-D refractive index cell image, and performing resolution improvement on the 3-D refractive index cell image based on a deep learning algorithm.

According to the present disclosure, a measured 3-D refractive index image of a cell can be rapidly generated as a high resolution image by using the deep learning algorithm without a process, such as dyeing or labeling. Accordingly, a cell monitoring speed and efficiency can be improved because a wider area can be photographed once. Furthermore, an AI model can be trained without photographing a low resolution image corresponding to a separate high-resolution image in such an AI model training process. Furthermore, the AI model can be easily trained because the AI model is trained based on physical characteristics of the 3-D refractive index image, and the stability of the training can be improved.

DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein:

FIGS. 13, 14, 15, 16A, and 16B are diagrams for describing an operation of a 3-D refractive index image resolution improvement model construction unit.

DETAILED DESCRIPTION

While illustrative embodiments have been illustrated and described, it will be appreciated that various changes can be made therein without departing from the spirit and scope of the disclosure.

A lot of research has been carried out on a technology for improving an image, such as the existing medical image. In particular, low dose rate X-ray computerized tomography (CT) for reducing a radiation exposure of a patient has severe noise and low resolution compared to high dose rate CT. In order to overcome such problems, conventionally, an efficient restoration scheme based on an interpretive principle of CT was developed. Recently, an image resolution conversion technology has been developed with the improvement of the AI technology. In this case, supervised training is performed on an AI model by constructing low dose rate CT data and high dose rate CT data for a limited phantom.

Accordingly, an object of the present disclosure is to provide a technology for rapidly restoring, to a high resolution image, a low-resolution 3-D refractive index image of a cell that is generated in order to photograph a wider area or photograph a wider area in a restrictive physical environment by using the AI technology. That is, the present disclosure provides a technology for generating a high-resolution 3-D refractive index microscope image by measuring morphologic features of a cell by using a 3-D refractive index microscope without dyeing or labeling and applying a deep learning algorithm in order to improve resolution of the high-resolution 3-D refractive index microscope image based on the measured morphologic features. Furthermore, in the present disclosure, an AI model is trained by considering physical characteristics of a 3-D refractive index image for the training of the AI model.

As the results of research of an example by considering the object, an inventor has discovered that a refractive index image having improved resolution can be generated simply and rapidly and has reached the present disclosure, by measuring a 3-D refractive index of a cell with limited resolution and applying the deep learning algorithm as a conversion algorithm having a measured value as an input. Hereinafter, various embodiments of the present disclosure are described with reference to the accompanying drawings.

Figure 1:
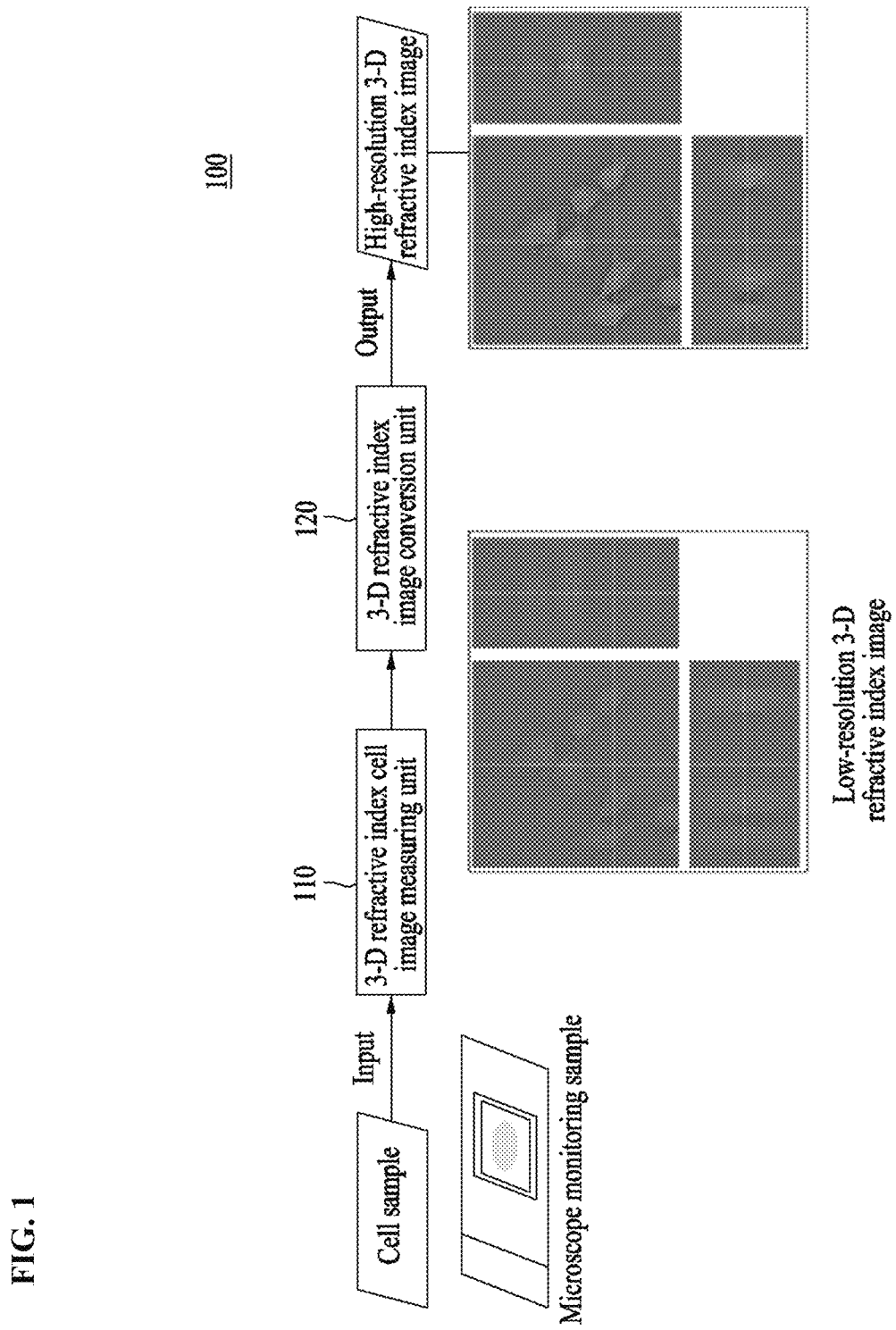
FIG. 1 is a diagram schematically illustrating a system for the present disclosure.

FIG. 1 is a diagram schematically illustrating a system 100 for the present disclosure.

Referring to FIG. 1, the system 100 receives, as an input, a cell sample to be monitored, and provides a high-resolution 3-D refractive index cell image of the cell as an output. Specifically, the system 100 includes a 3-D refractive index cell image measuring unit 110 and a 3-D refractive index image conversion unit 120.

The 3-D refractive index cell image measuring unit 110 measures a 3-D refractive index cell image of a cell sample. The 3-D refractive index cell image measuring unit 110 photographs the state in which a cell to be monitored has been placed or smeared on a slide.

All objects have refractive index distributions. The refractive index is a unique optical physical quantity of a substance itself that describes how much speed slows down when light passes through the substance. In order to measure the 3-D refractive index of a cell, optical diffraction tomography, 3-D digital holographic microscopy, tomographic phase microscopy, or intensity-based diffraction tomography may be used. An optical implementation method using a light source may include a method using a coherent light source and an interference system or a method using a partially coherent source without an interference system.

Figure 2:
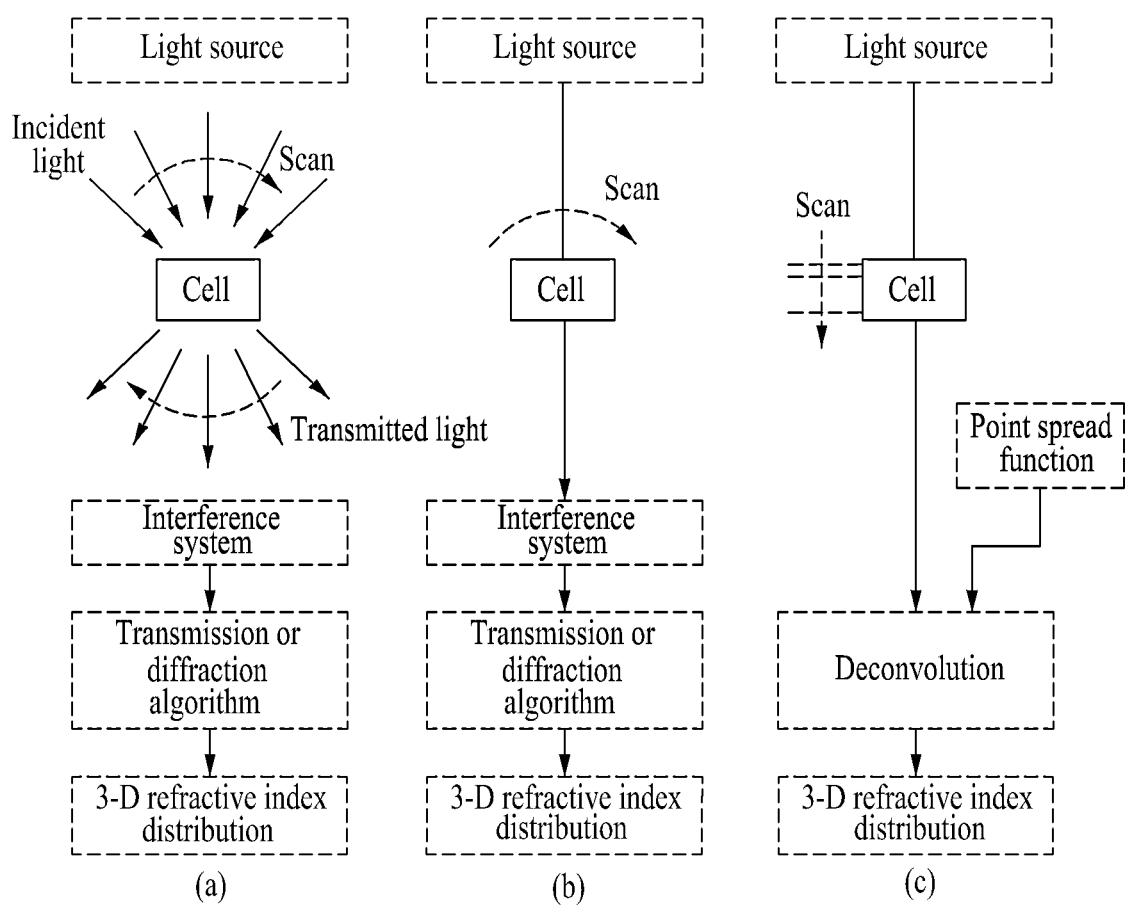
FIG. 2 is a diagram illustrating various measurement-optical implementations for a 3-D refractive index cell image measuring unit in FIG. 1.

FIG. 2 is a diagram illustrating various measurement-optical implementations for the 3-D refractive index cell image measuring unit 110 in FIG. 1. The optical diffraction tomography and the 3-D digital holographic microscopy may use the same optical implementation. As illustrated in FIG. 2(*a*) or 2(*b*), if a coherent light source is used as incident light, a hologram of transmitted light that is diffracted or projected by a cell is measured by using an interference system. In this case, as illustrated in FIG. 2(*a*), a 3-D refractive index distribution of the cell is measured by using several sheets of two-dimensional (2-D) holograms that are obtained by rotating and scanning the cell at different angles at which light is incident to the cell. In this case, a difference between the optical diffraction tomography and the 3-D digital holographic microscopy is a restoration algorithm in which whether light is diffracted in a sample is considered. Alternatively, as illustrated in FIG. 2(*b*), a cell may be directly rotated without rotating incident light, and a 3-D refractive index may be measured. As illustrated in FIG. 2(*c*), if a partial coherent light source is used as incident light, an interference system is not required. In this case, a 3-D brightness image is obtained by axially scanning a cell while radiating, to the cell, the incident light having an optimized pattern. A 3-D refractive index distribution of the cell is obtained by performing deconvolution on the obtained 3-D brightness image based on a point spread function corresponding to a pattern of the incident light.

Figure 3:
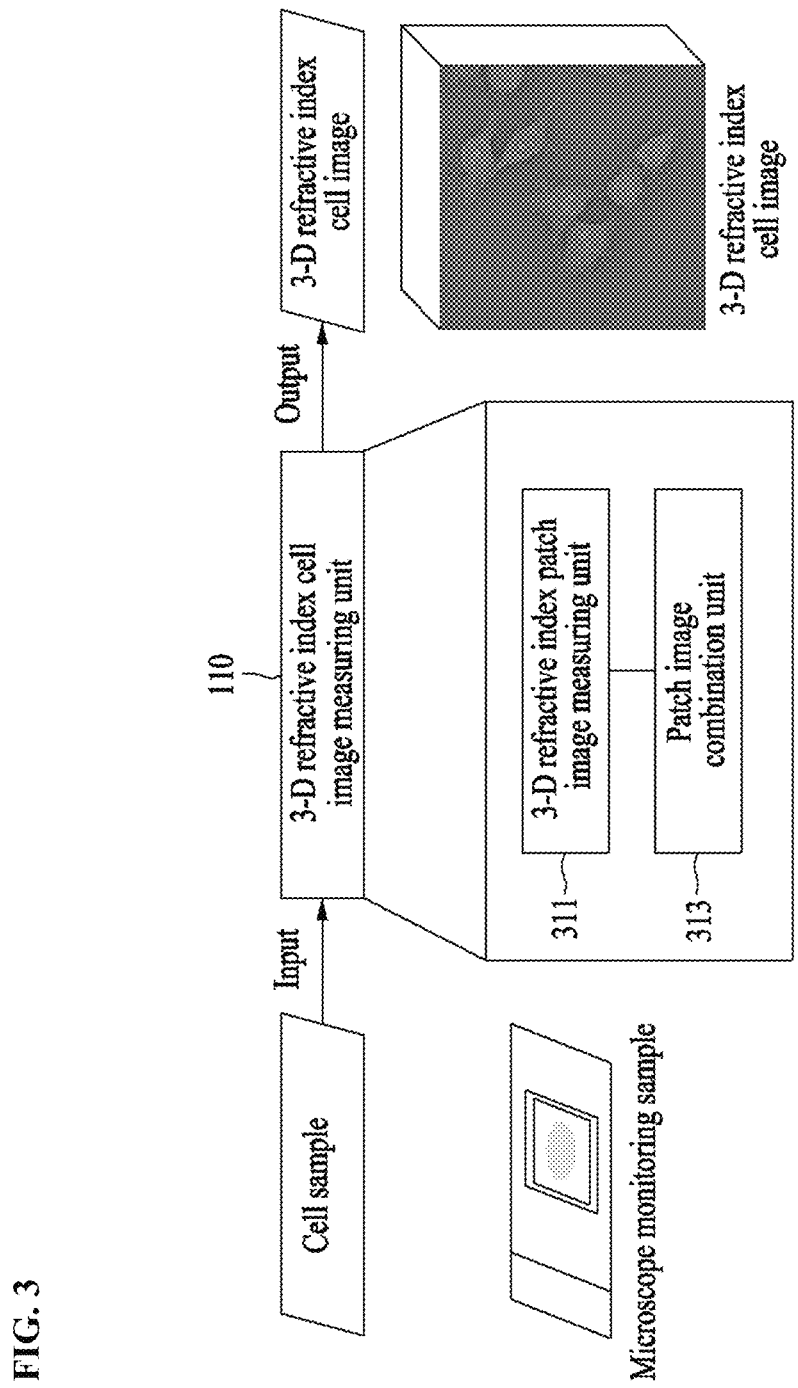
FIG. 3 is a diagram specifically illustrating an embodiment of the 3-D refractive index cell image measuring unit in FIG. 1.

FIG. 3 is a diagram specifically illustrating an embodiment of the 3-D refractive index cell image measuring unit 110 in FIG. 1. According to an embodiment, as illustrated in FIG. 3, the 3-D refractive index cell image measuring unit 110 includes a 3-D refractive index patch image measuring unit 311 and a patch image combination unit 313. If a monitoring area is greater than an area that can be photographed once, the 3-D refractive index patch image measuring unit 311 photographs 3-D refractive index patch images of different areas within the monitoring area. The patch image combination unit 313 generates a 3-D refractive index slide image, that is, a 3-D refractive index cell image, by connecting the 3-D refractive index patch images.

The 3-D refractive index image conversion unit 120 performs resolution improvement on the 3-D refractive index cell image generated by the 3-D refractive index cell image measuring unit 110. In this case, the 3-D refractive index image conversion unit 120 performs resolution improvement on the 3-D refractive index cell image of the entire monitoring area. That is, the 3-D refractive index image conversion unit 120 converts the low-resolution 3-D refractive index cell image to a high-resolution 3-D refractive index cell image. To this end, the 3-D refractive index image conversion unit 120 uses a deep learning algorithm, in particular, a convolutional neural network (CNN).

Figure 4:
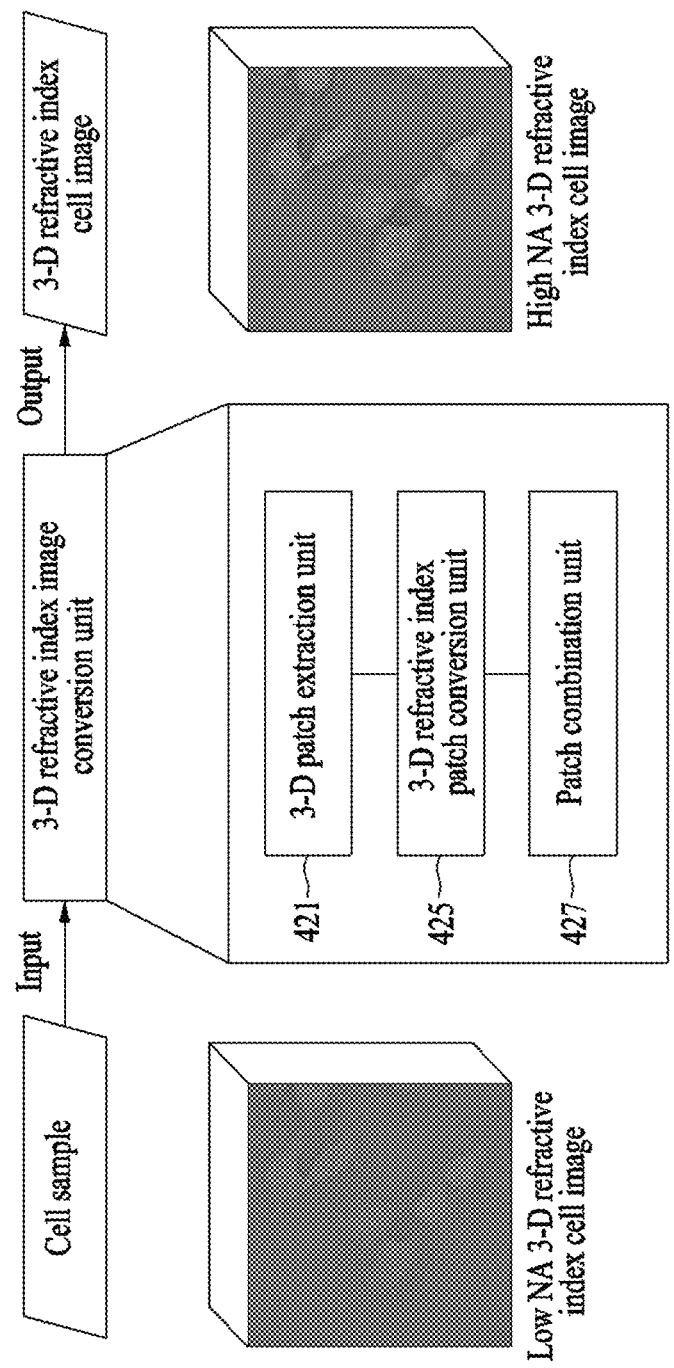
FIG. 4 is a diagram specifically illustrating an embodiment of a 3-D refractive index image conversion unit in FIG. 1.

FIG. 4 is a diagram specifically illustrating an embodiment of the 3-D refractive index image conversion unit 120 in FIG. 1. According to an embodiment, as illustrated in FIG. 4, the 3-D refractive index image conversion unit 120 generates 3-D refractive index patches of a 3-D refractive index cell image, improves resolution of the 3-D refractive index cell image in a patch unit, and then combines the 3-D refractive index patches by considering efficiency and a conversion calculation environment of 3-D conversion for an efficient conversion process. That is, the 3-D refractive index image conversion unit 120 converts a low-resolution 3-D refractive index cell image into a high-resolution 3-D refractive index cell image in a patch unit. Specifically, the 3-D refractive index image conversion unit 120 includes a 3-D patch extraction unit 421, a 3-D refractive index patch conversion unit 425, and a patch combination unit 427.

Figure 5:
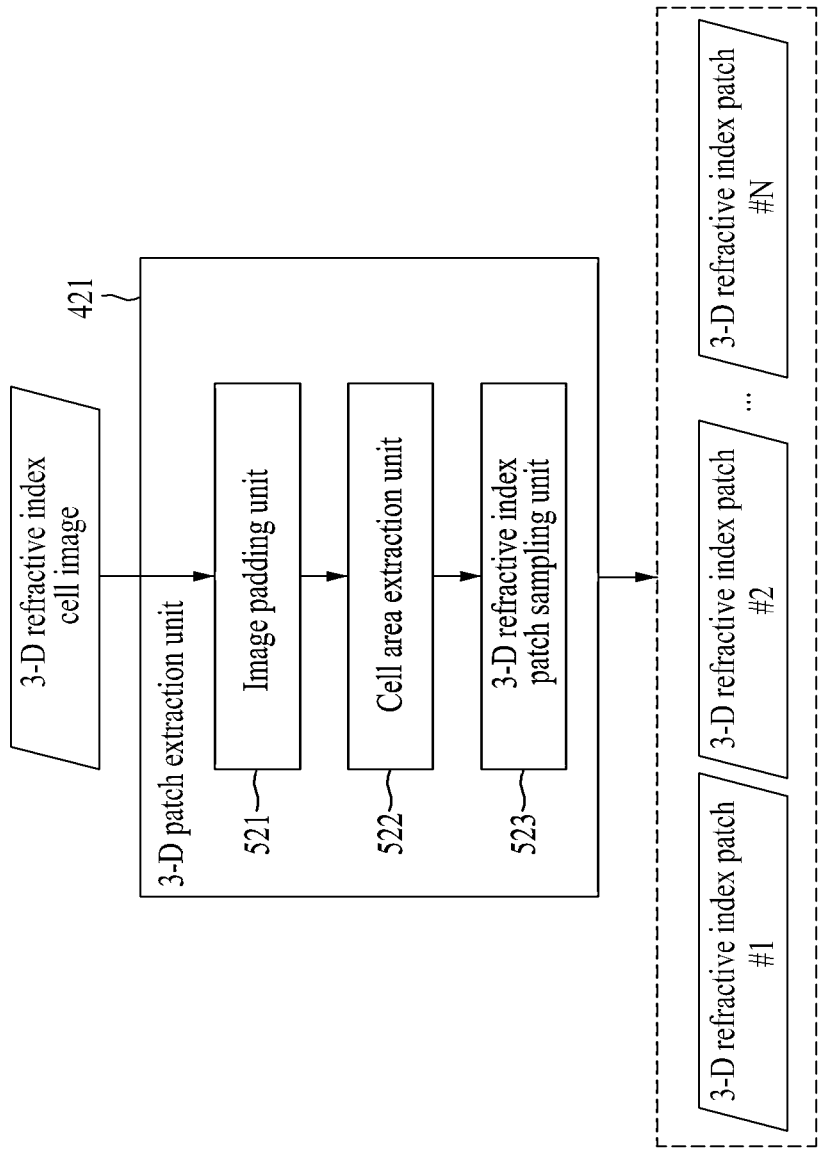
FIG. 5 is a diagram illustrating an internal construction of a 3-D patch extraction unit in FIG. 4.
Figure 6:
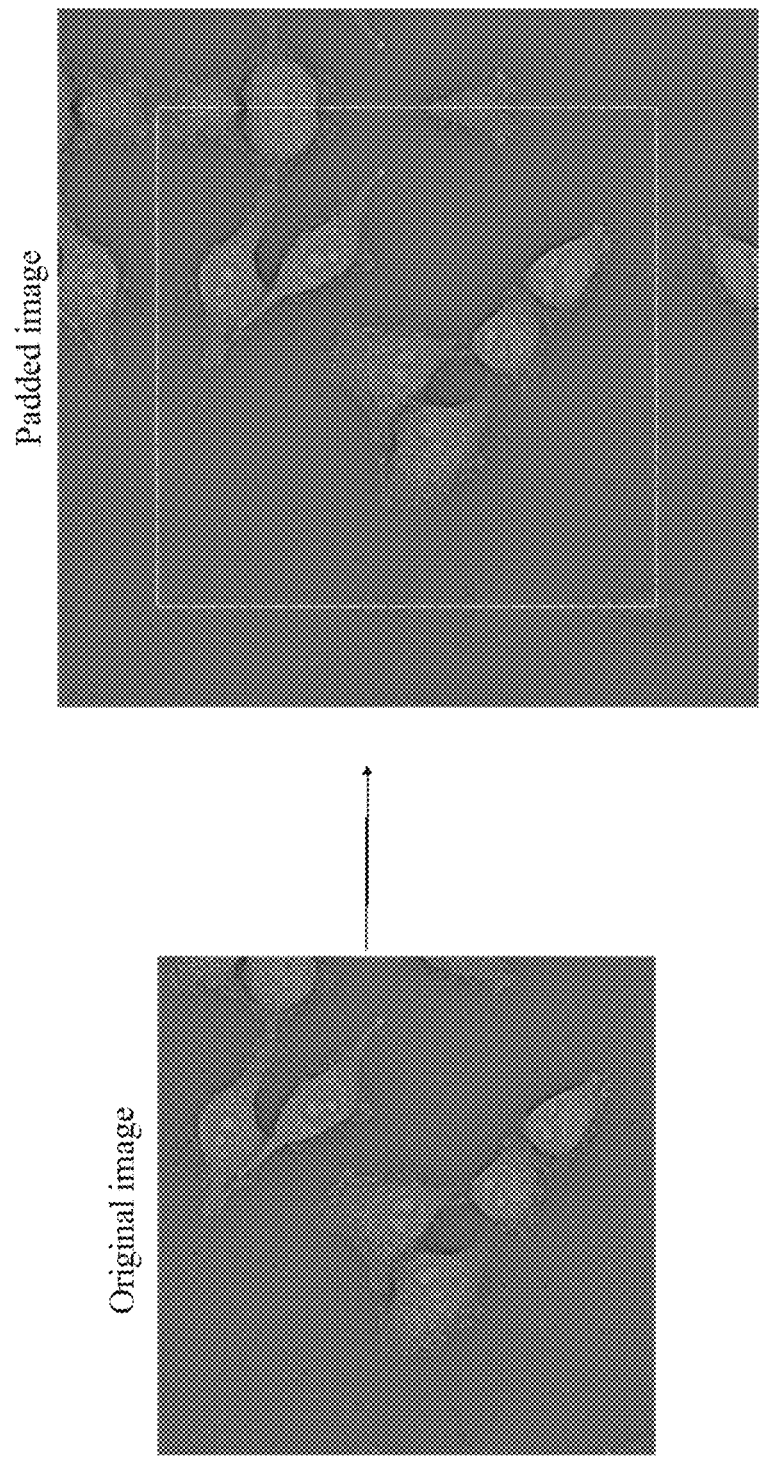
FIGS. 6 and 7 are diagrams for describing an operation of the 3-D patch extraction unit in FIG. 4.
Figure 7:
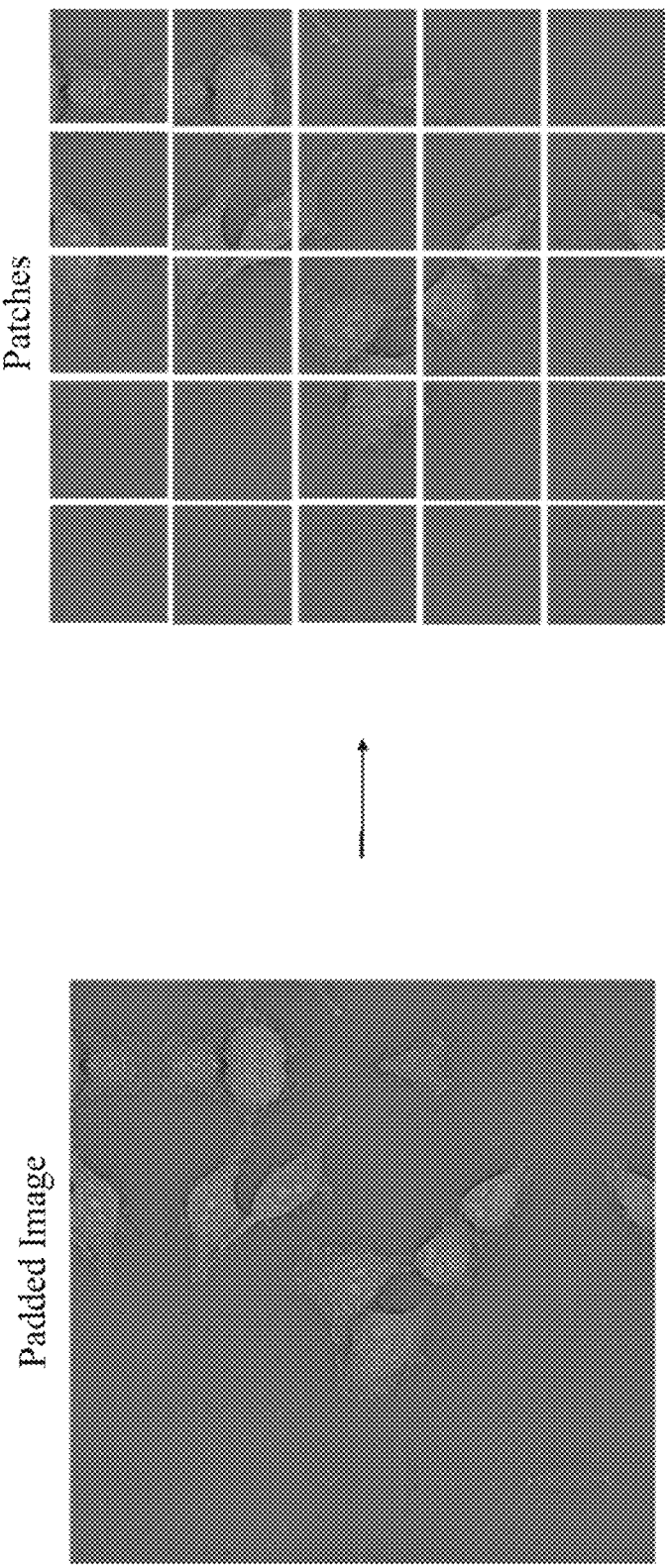

The 3-D patch extraction unit 421 extracts 3-D refractive index patches from a 3-D refractive index cell image. In this case, the 3-D patch extraction unit 421 performs patch sampling on a cell area after a padding process prior to the extraction of the 3-D refractive index patches in order to prevent a loss of an outskirt area value which occurs in a stable result derivation and combination process in an image outskirt area. FIG. 5 is a diagram illustrating an internal construction of the 3-D patch extraction unit 421 in FIG. 4. FIGS. 6 and 7 are diagrams for describing an operation of the 3-D patch extraction unit 421 in FIG. 4. As illustrated in FIG. 5, the 3-D patch extraction unit 421 includes an image padding unit 521, a cell area extraction unit 522, and a 3-D refractive index patch sampling unit 523. As illustrated in FIG. 6, the image padding unit 521 pads images that are symmetrical to each other by using the outskirt of an internal image as an axis so that the continuity of the internal image can be guaranteed in proportion to the size of a patch that is used only in the outskirt, with respect to the entire 3-D refractive index cell image. The cell area extraction unit 522 extracts a cell area from the padded image in order to prevent excessive learning of an unnecessary background portion. As illustrated in FIG. 7, the 3-D refractive index patch sampling unit 523 samples 3-D refractive index patches from the padded image.

Figure 8:
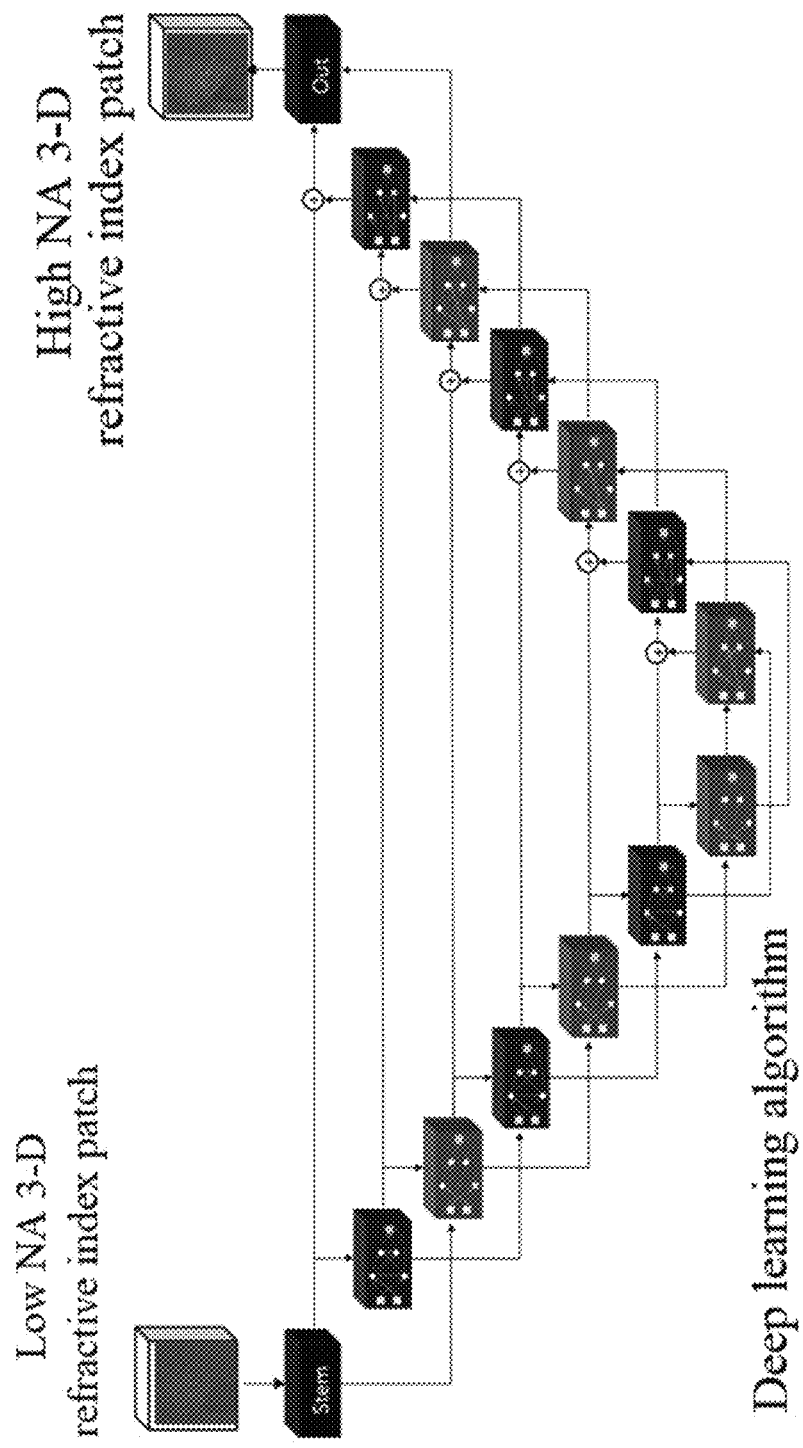
FIGS. 8 and 9 are diagrams for describing an operation of a 3-D refractive index patch conversion unit in FIG. 4.
Figure 9:
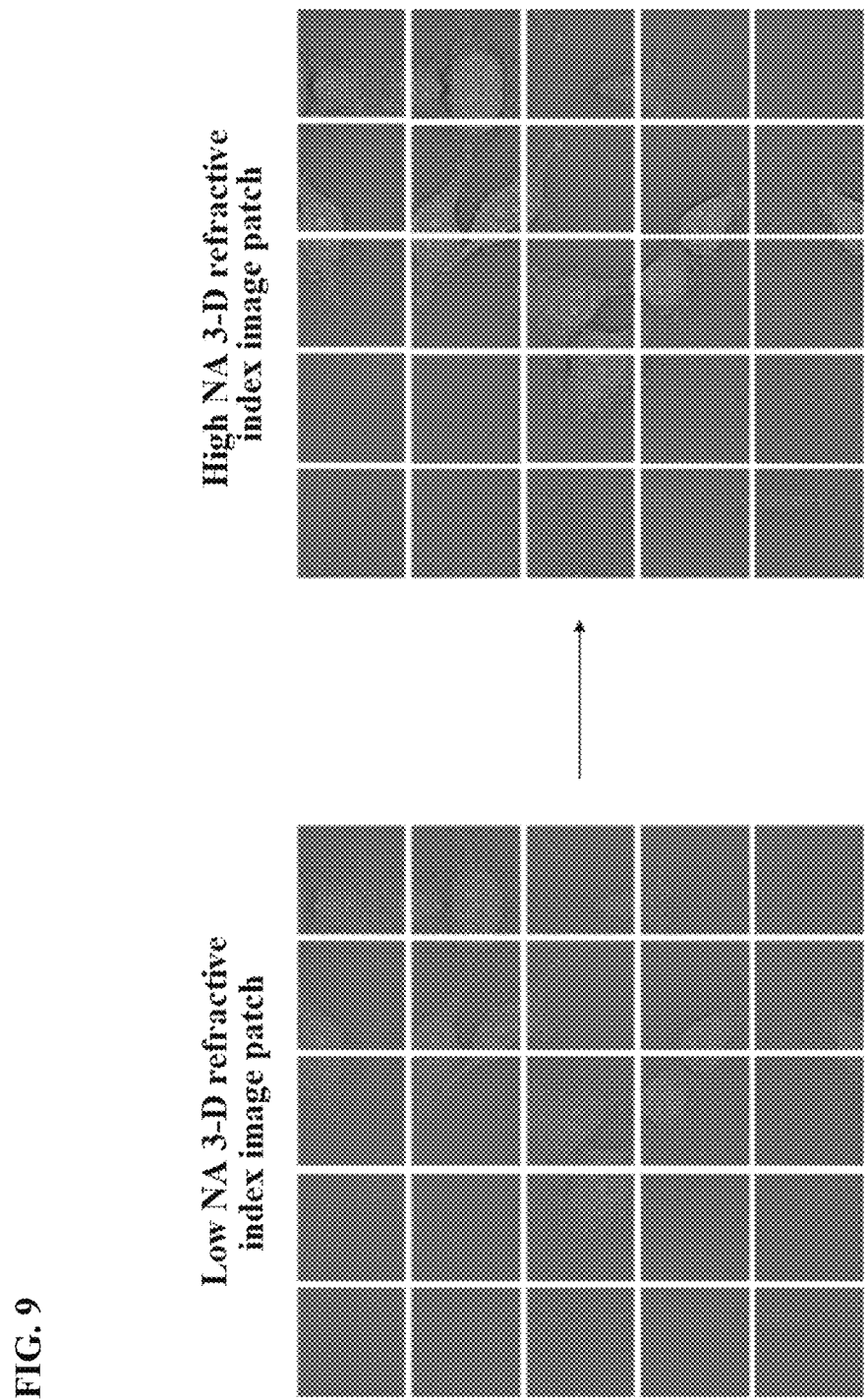

The 3-D refractive index patch conversion unit 425 performs resolution improvement on each of the 3-D refractive index patches by using the deep learning algorithm. In this case, the deep learning algorithm has been previously trained. FIGS. 8 and 9 are diagrams for describing an operation of the 3-D refractive index patch conversion unit 425 in FIG. 4. As illustrated in FIGS. 8 and 9, input information for the deep learning algorithm is the 3-D refractive index information of cells and has low resolution. Information output by the deep learning algorithm is converted 3-D refractive index information corresponding to each of the 3-D refractive index patches, and has high resolution.

Figure 10:
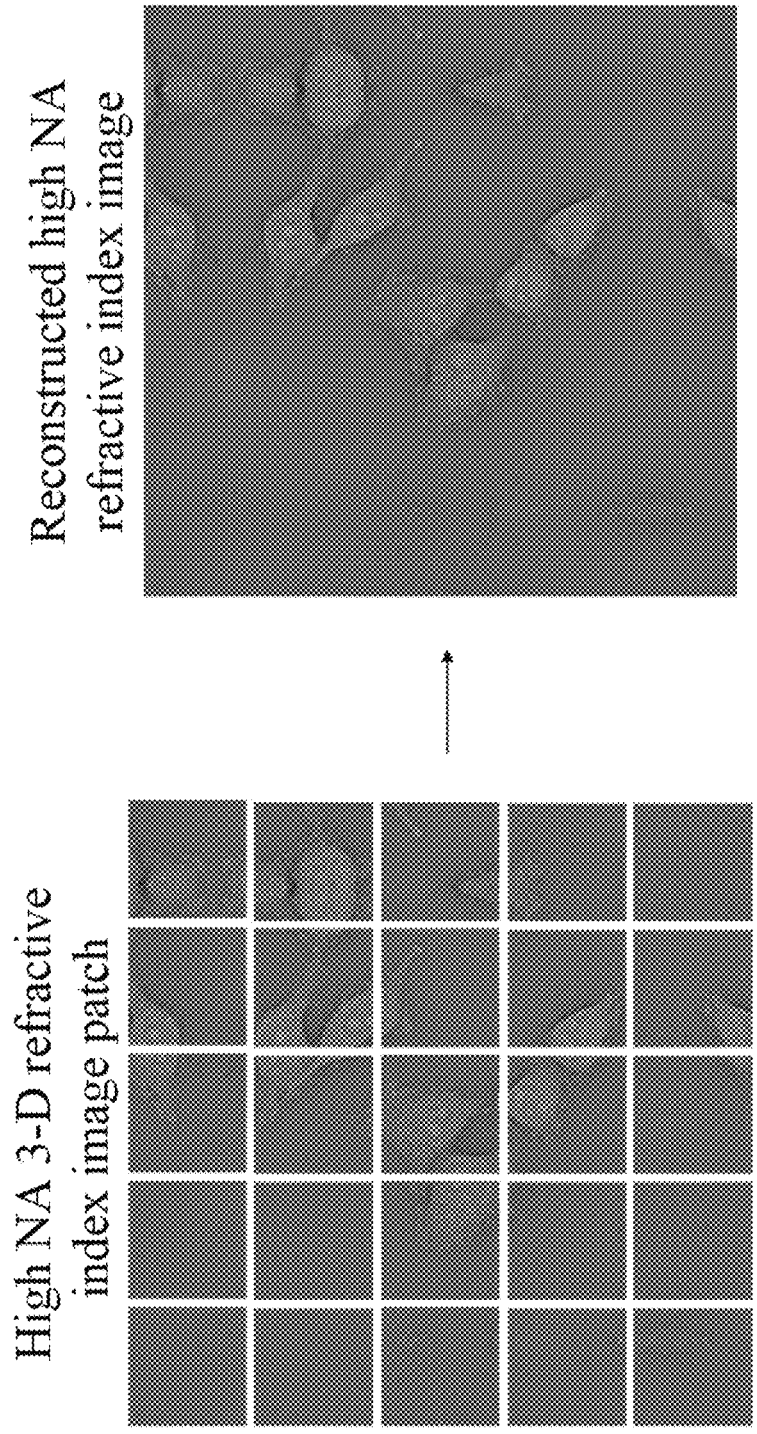
FIGS. 10 and 11 are diagrams for describing an operation of a patch combination unit in FIG. 4.
Figure 11:
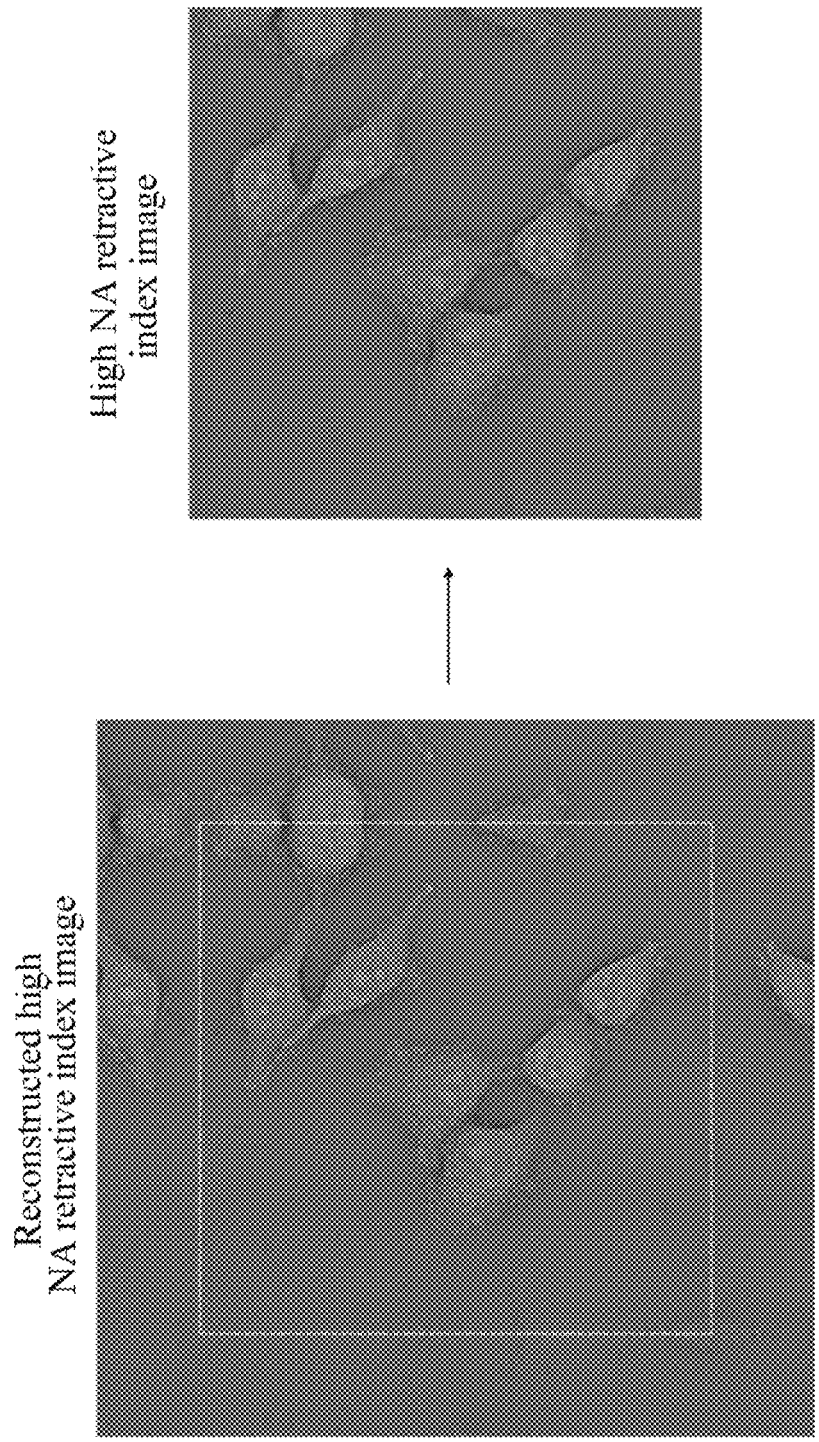

The patch combination unit 427 combines the 3-D refractive index patches having improved resolution again. FIGS. 10 and 11 are diagrams for describing an operation of the patch combination unit 427 in FIG. 4. As illustrated in FIG. 10, the patch combination unit 427 reconstructs, as one image, the 3-D refractive index patches having improved resolution by combining the 3-D refractive index patches again. In this case, the patch combination unit 427 adds a linear/non-linear weight according to the distance from the center of a patch by multiplying the weight in order to guarantee the continuity of the reconstructed image with respect to a redundant area. The weight is applied to the patch in the form of a spline kernel function. As the patch becomes closer to a central part of a neighbor patch as becoming farther from the central part of the patch, a value closer to a predicted value of the neighbor patch having a higher weight is output. Furthermore, as illustrated in FIG. 11, the patch combination unit 427 removes the area padded by the 3-D patch extraction unit 421. Such results become the final one 3-D image, that is, a high-resolution 3-D refractive index cell image.

Figure 12:
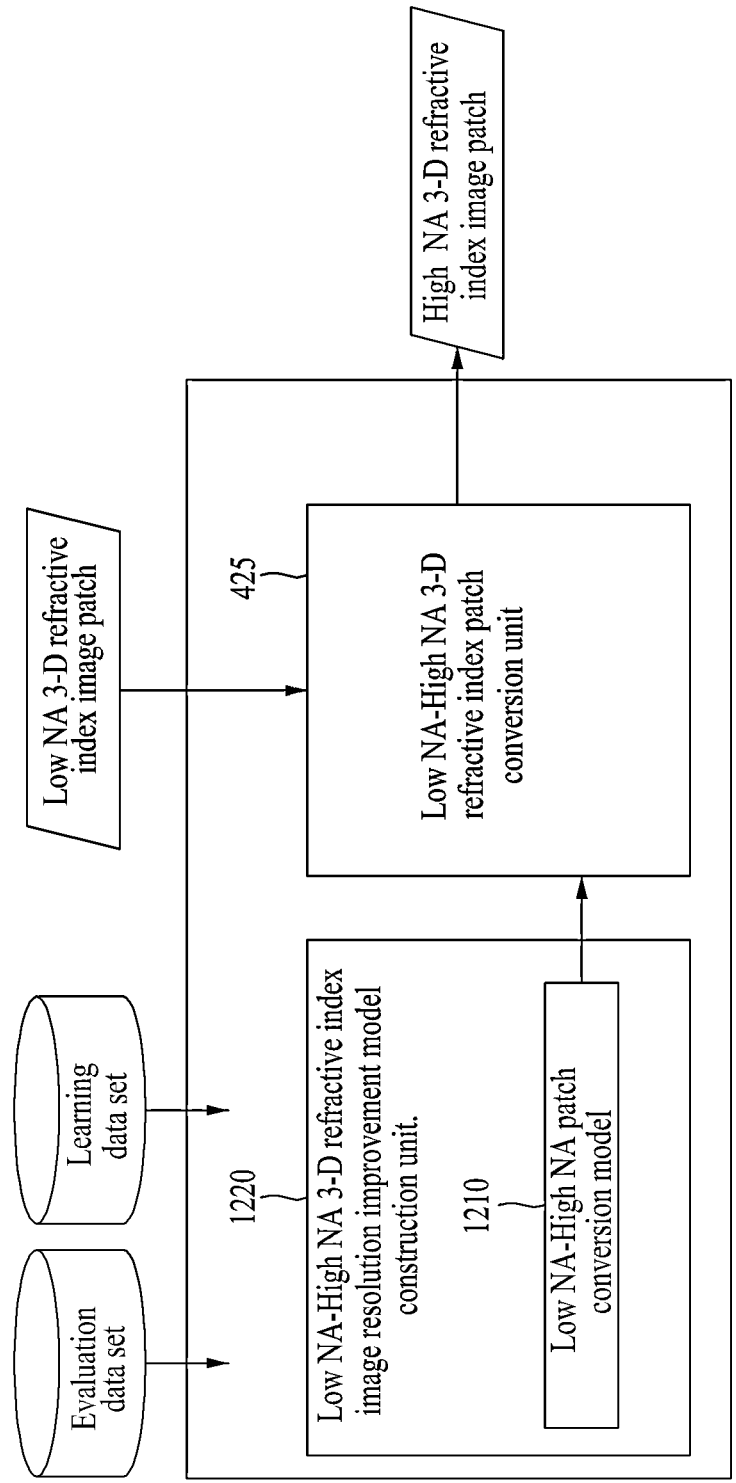
FIG. 12 is a diagram for describing a conversion model of the 3-D refractive index patch conversion unit in FIG. 4.

FIG. 12 is a diagram for describing a conversion model 1210 of the 3-D refractive index patch conversion unit 425 in FIG. 4.

Referring to FIG. 12, the 3-D refractive index patch conversion unit 425 includes an AI conversion model 1210 constructed based on the deep learning algorithm, and performs resolution improvement on each of 3-D refractive index patches based on the conversion model 1210. In this case, the conversion model 1210 is constructed by using a high-resolution 3-D refractive index image and a low-resolution 3-D refractive index image that is theoretically generated based on the high-resolution 3-D refractive index image. The conversion model 1210 is trained by a 3-D refractive index image resolution improvement model construction unit 1220.

Figure 13:
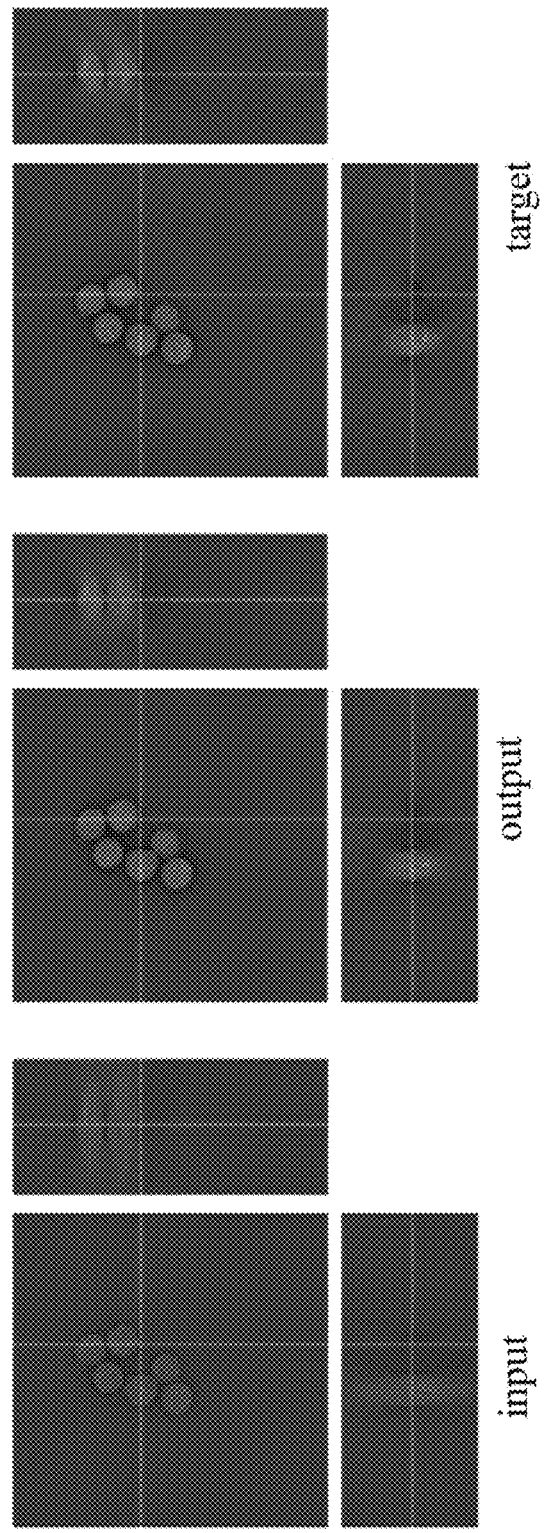
Figure 14:
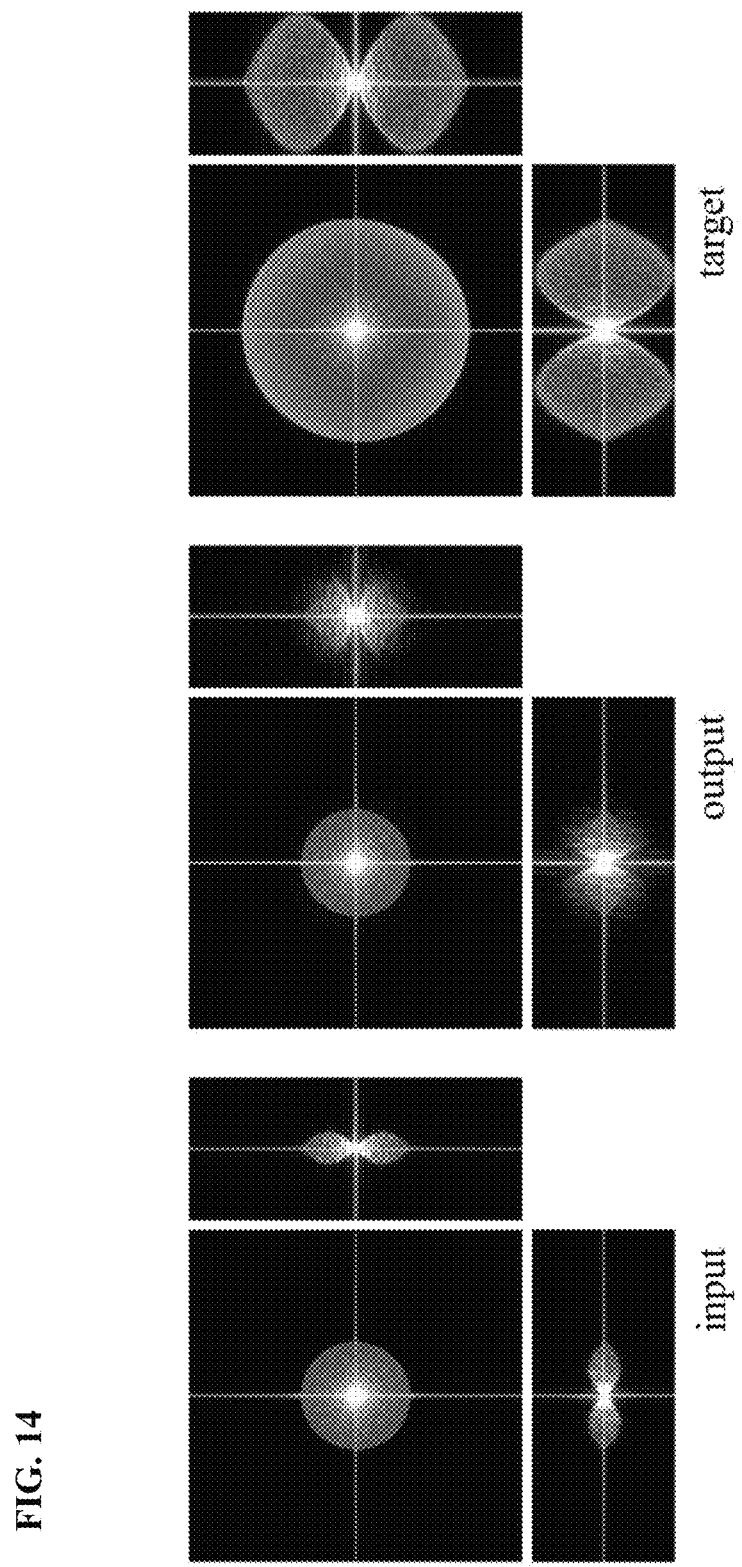
Figure 16A:
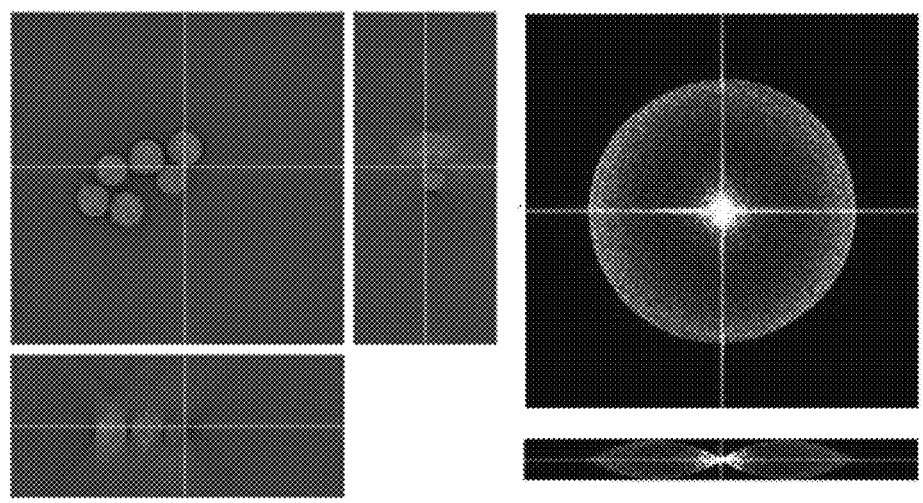
Figure 16B:
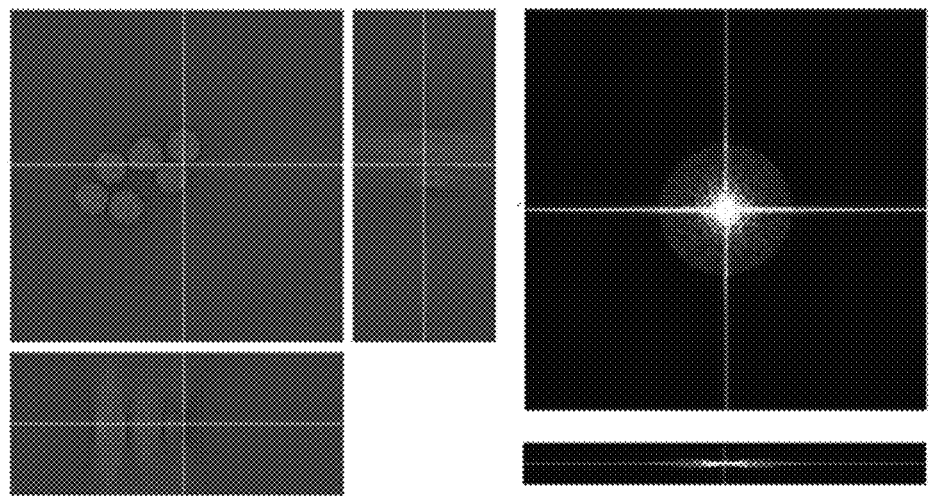

When the 3-D refractive index image resolution improvement model construction unit 1220 trains the conversion model 1210, several types of loss functions are combined and used. Theoretically, a mean squared error is used. FIGS. 13, 14, 15, 16A, and 16B are diagrams for describing an operation of the 3-D refractive index image resolution improvement model construction unit 1220. According to an embodiment, a difference between images in the Fourier space becomes clear as illustrated in FIG. 14, compared to a difference between images which may be monitored as illustrated in FIG. 13. Accordingly, in the present disclosure, when the conversion model 1210 is trained, an FFT error function is used so that frequency information of an output image and a target image can be compared in the Fourier space in order to refer to physical characteristics of a 3-D refractive index image. In order to calculate an error in the Fourier space in a pixel unit, the error function, such as Equation 1, is designed and used.

$$L\_FFT = 1/n\_pixel \|F(\text{target}) - F(\text{output})\| \qquad \text{[Equation 1]}$$

In Equation 1, F means a Fourier conversion. $\|\cdot\|$ means an L1 norm. A model trained through such a loss function is evaluated based on various evaluation indices which may be checked in an image level. An index that is used as the evaluation index includes structural similarity (SSIM), a mean squared error (MSE), a peak signal to noise ratio (PSNR), and a Pearson correlation coefficient (PCC). The corresponding index is also used as an evaluation index for an image output by the model (refer to FIG. 15). An applied image can be stably driven although an environment in which data is generated is different by using such various characteristics.

The deep learning algorithm that is used in the present disclosure, that is, the AI conversion model 1210, is trained based on supervised training that uses input and output images. Accordingly, a pair of a high resolution image and a low resolution image of a photographed image is necessary for the training of the AI conversion model 1210 according to the present disclosure. If a high resolution image and a low resolution image are separately photographed, a situation in which shapes or locations of cells are not matched due to a movement of a cell may occur. Accordingly, a low resolution image is generated from a high resolution image through frequency information filtering. A low resolution image was generated through filtering using a method of leaving only frequency information of a space, which might be occupied by the low resolution image, among pieces of frequency information in the Fourier space of a high resolution image (refer to FIGS. 16A and 16B). In this case, the NA of the high resolution image had a value of 0.72, and the NA of the low resolution image had a value of 0.35. Another resolution may also be constructed.

According to the present disclosure, a measured 3-D refractive index image of a cell can be rapidly generated as a high resolution image by using the deep learning algorithm without a process, such as dyeing or labeling. Accordingly, a cell monitoring speed and efficiency can be improved by photographing a wider area once. Furthermore, an AI model can be trained without a low resolution image corresponding to a separate high resolution image in such an AI model training process. Furthermore, the AI model can be easily trained the stability of the training can be improved by performing the training based on physical characteristics of the 3-D refractive index image.

In short, the present disclosure provides the system 100 and method for improving resolution of a 3-D refractive index microscope image based on the AI technology.

The system 100 according to the present disclosure includes the 3-D refractive index cell image measuring unit 110 configured to obtain a 3-D refractive index cell image and the 3-D refractive index image conversion unit 120 configured to perform resolution improvement on the 3-D refractive index cell image based on the deep learning algorithm.

According to the present disclosure, the 3-D refractive index image conversion unit 120 includes the 3-D patch extraction unit 421 configured to generate a plurality of 3-D refractive index patches from the 3-D refractive index cell image, the 3-D refractive index patch conversion unit 425 configured to perform the resolution improvement on each of the 3-D refractive index patches based on the deep learning algorithm, and the patch combination unit 427 configured to combine the 3-D refractive index patches.

According to the present disclosure, the 3-D patch extraction unit 421 includes the image padding unit 521 configured to construct a padded image by adding a padding area to the outskirt of the 3-D refractive index cell image and the sampling unit 523 configured to sample the 3-D refractive index patches from the padded image.

According to the present disclosure, the patch combination unit 427 is configured to remove the padding area after combining the 3-D refractive index patches.

According to the present disclosure, the deep learning algorithm is constructed based on a combination of the mean squared error function and the Fourier conversion error function.

According to the present disclosure, the 3-D refractive index cell image measuring unit 110 is configured to obtain the 3-D refractive index cell image by measuring a 3-D refractive index distribution of a cell by using an interference system also if a coherent light source is used and to obtain the 3-D refractive index cell image by measuring the 3-D refractive index distribution of the cell through deconvolution using a point diffusion score if a partial coherent light source is used.

A method according to the present disclosure includes steps of obtaining a 3-D refractive index cell image and performing resolution improvement on the 3-D refractive index cell image based on the deep learning algorithm.

According to the present disclosure, the step of performing the resolution improvement includes steps of generating a plurality of 3-D refractive index patches from the 3-D refractive index cell image, performing the resolution improvement on each of the 3-D refractive index patches based on the deep learning algorithm, and combining the 3-D refractive index patches.

According to the present disclosure, the step of generating the 3-D refractive index patches includes steps of constructing a padded image by adding a padding area to the outskirt of the 3-D refractive index cell image and sampling the 3-D refractive index patches from the padded image.

According to the present disclosure, the step of combining the 3-D refractive index patches includes removing the padding area after combining the 3-D refractive index patches.

According to the present disclosure, the deep learning algorithm is constructed based on a combination of the mean squared error function and the Fourier conversion error function.

According to the present disclosure, the step of obtaining the 3-D refractive index cell image includes steps of obtaining the 3-D refractive index cell image by measuring a 3-D refractive index distribution of a cell by using an interference system also if a coherent light source is used and to obtaining the 3-D refractive index cell image by measuring the 3-D refractive index distribution of the cell through deconvolution using a point diffusion score if a partial coherent light source is used.

Various embodiments of this document and the terms used in the embodiments are not intended to limit the technology described in this document to a specific embodiment, but should be construed as including various changes, equivalents and/or alternatives of a corresponding embodiment. In relation to the description of the drawings, similar reference numerals may be used in similar elements. An expression of the singular number may include an expression of the plural number unless clearly defined otherwise in the context. In this document, an expression, such as "A or B", "at least one of A and/or B", "A, B, or C", or "at least one of A, B and/or C", may include all of possible combinations of items listed together. Expression, such as "a first," "a second," "the first", and "the second", may modify corresponding elements regardless of their sequence or importance, and are used to only distinguish one element from the other element and do not limit the corresponding element. When it is described that one (e.g., a first) element is "(physically or functionally) connected to" or "coupled with" the other (e.g., a second) element, the one element may be directly connected to the other element or may be connected to the other element through another element (e.g., a third element).

According to various embodiments, each of the described elements may include a single entity or a plurality of entities. According to various embodiments, at least one element or operation of the aforementioned elements may be omitted or at least one element or operation may be added. Alternatively, or additionally, a plurality of elements may be integrated into a single element. In such a case, the integrated element may identically or similarly perform a function performed by a corresponding one of the plurality of elements before one or more functions of each of the plurality of elements are integrated.

The embodiments of the disclosure in which an exclusive property or privilege is claimed are defined as follows:

1. A system for improving resolution of a three-dimensional (3-D) refractive index image based on an artificial intelligence (AI) technology, the system comprising: a 3-D refractive index cell image measuring unit configured to obtain a 3-D refractive index cell image; and a 3-D refractive index image conversion unit configured to perform resolution improvement on the 3-D refractive index cell image based on a deep learning algorithm;

a 3-D patch extraction unit configured to generate a plurality of 3-D refractive index patches from the 3-D refractive index cell image;

a 3-D refractive index patch conversion unit configured to perform the resolution improvement on each of the 3-D refractive index patches based on the deep learning algorithm;

a patch combination unit configured to combine the 3-D refractive index patches;

an image padding unit configured to construct a padded image by adding a padding area to an outskirt of the 3-D refractive index cell image; and a sampling unit configured to sample the 3-D refractive index patches from the padded image;

wherein the patch combination unit is configured to remove the padding area after combining the 3-D refractive index patches;

wherein the patch combination unit adds a linear/non-linear weight according to a distance from a center of a patch of the plurality of 3-D refractive index patches by multiplying the weight in order to guarantee continuity of the reconstructed image with respect to a redundant area; and wherein the deep learning algorithm is constructed based on a combination of a mean squared error function and a Fourier conversion error function.

2. The system of claim 1, wherein the 3-D refractive index cell image measuring unit is configured to: obtain the 3-D refractive index cell image by measuring a 3-D refractive index distribution of a cell by using an interference system also if a coherent light source is used; and obtain the 3-D refractive index cell image by measuring the 3-D refractive index distribution of the cell through deconvolution using a point diffusion score if a partial coherent light source is used.

3. A method of a system for improving resolution of a three-dimensional (3-D) refractive index image based on an artificial intelligence (AI) technology, the method comprising the steps of:

obtaining a 3-D refractive index cell image; and performing resolution improvement on the 3-D refractive index cell image based on a deep learning algorithm;

wherein the step of performing resolution improvement comprises the steps of generating a plurality of 3-D refractive index patches from the 3-D refractive index cell image;

performing the resolution improvement on each of the 3-D refractive index patches based on the deep learning algorithm; and combining the 3-D refractive index patches; and wherein the step of generating the 3-D refractive index patches comprises constructing a padded image by adding a padding area to an outskirt of the 3-D refractive index cell image and sampling the 3-D refractive index patches from the padded image, wherein combining the 3-D refractive index patches comprises removing the padding area after combining the 3-D refractive index patches;

adding a linear/non-linear weight according to a distance from a center of a patch of the plurality of 3-D refractive index patches by multiplying the weight in order to guarantee continuity of the reconstructed image with respect to a redundant area; and constructing the deep learning algorithm based on a combination of a mean squared error function and a Fourier conversion error function.

4. The method of claim 3, wherein the obtaining of the 3-D refractive index cell image comprises: obtaining the 3-D refractive index cell image by measuring a 3-D refractive index distribution of a cell by using an interference system also if a coherent light source is used; and obtaining the 3-D refractive index cell image by measuring the 3-D refractive index distribution of the cell through deconvolution using a point diffusion score if a partial coherent light source is used.

* * * * *